United States Patent [19]

Kraus

[11] 4,339,966

[45] Jul. 20, 1982

[54] INFINITELY VARIABLE TRANSMISSION DRIVE ARRANGEMENT ESPECIALLY FOR AUTOMOBILES

[75] Inventor: Charles E. Kraus, Austin, Tex.

[73] Assignee: Excelermatic Inc., Austin, Tex.

[21] Appl. No.: 154,948

[22] Filed: May 30, 1980

[51] Int. Cl.³ .................... F16H 35/04; F16H 15/08; F16H 1/44

[52] U.S. Cl. ...................................... 74/650; 74/190; 74/196; 74/200; 74/710; 74/752 B; 74/752 C; 74/711

[58] Field of Search ................. 74/200, 190, 194, 196, 74/650, 710, 710.5, 711, 752 B, 752 C, 674; 180/75, 76

[56] References Cited

U.S. PATENT DOCUMENTS

| | | | |
|---|---|---|---|
| 3,299,744 | 1/1967 | Kraus | 74/720.5 |
| 3,402,799 | 9/1968 | Tharpe | 74/711 X |
| 3,404,585 | 10/1968 | Roper | 74/711 |
| 3,596,467 | 8/1971 | Avery | 74/200 X |
| 3,748,928 | 7/1973 | Shiber | 74/711 |
| 3,810,398 | 5/1974 | Kraus | 74/200 |
| 3,845,671 | 11/1974 | Sharp et al. | 74/711 X |
| 3,906,812 | 9/1975 | Kagata | 74/711 |
| 4,086,820 | 5/1978 | Kraus et al. | 74/200 |
| 4,162,712 | 7/1979 | Nelson | 74/711 X |
| 4,258,588 | 3/1981 | Yum | 74/711 X |

Primary Examiner—Leslie Braun
Attorney, Agent, or Firm—Klaus J. Bach

[57] ABSTRACT

An infinitely variable transmission drive arrangement for driving different loads from a common power source through two infinitely variable transmissions whose input shafts are connected to the common power source and whose output shafts are connected each to one of said loads. Means are provided for independently varying the transmission ratio of both infinitely variable transmissions and means for interconnecting the two infinitely variable transmissions for limiting the difference of their transmission ratio adjustment.

4 Claims, 2 Drawing Figures

INFINITELY VARIABLE TRANSMISSION DRIVE ARRANGEMENT ESPECIALLY FOR AUTOMOBILES

BACKGROUND OF THE INVENTION

The invention relates to a transmission drive arrangement with infinitely variable transmission ratio especially for automobiles in which one such infinitely variable transmission is used for transmitting drive power to each of the driven wheels.

The wheels of a car do not always rotate at the same speed. Differential speed of the curve inner and outer drive wheels is normally accommodated by a differential transmission which provides for each of a pair of driven wheels the same torque but permits rotation of the wheels at different speeds.

If each of a pair of drive wheels is driven separately by means of a pair of infinitely variable transmissions, for example of the type described in U.S. Pat. No. 3,810,398, there would be no need for a differential transmission if the transmission ratio of the two transmissions is controlled properly. A transmission and transmission ratio control arrangement in which the transmission ratio can be so controlled as to provide essentially the same torque for both of a pair of drive wheels is disclosed in U.S. Pat. No. 4,086,820. Such arrangements would be relatively inexpensive as the power is split and each of the two traction roller transmissions would be relatively small. A problem could occur with such an arrangement, however, when traction is lost at one wheel because the transmission ratio of the transmission for said one wheel would then rapidly change toward a greater ratio and the wheel speed would rapidly increase. When the wheel then arrives again at full traction the forces on the wheel and the respective transmission components are undesirably high.

It would therefore be desirable if such slipping could be avoided. Not only would excessive transmission load and wear be prevented but the chances of slipping on snow or mud would be reduced and driving safety could be improved.

SUMMARY OF THE INVENTION

In an infinitely variable transmission drive arrangement for driving different loads from a common power source by means of two transmissions with infinitely variable transmission ratios, the input shafts of the two transmissions are connected to a common power source, and of the output shafts of said transmissions, one is connected to one and the other to the other of the loads. Means are provided for independently varying the transmission ratios of said transmissions depending on the loads transmitted and there are means providing for interaction between the two transmissions so as to limit the difference in ratio adjustment of said two transmissions.

The limits are so selected that only a certain difference in speed of the two loads as it may be desired for certain applications is permitted. Applied for example to a vehicle in which each one of the two transmissions is connected to one of a pair of wheels, the limit is so selected as to permit a curve-outer wheel to rotate at a certain higher speed than the curve-inner wheel corresponding to the smallest turning circle for which the vehicle is designed.

DESCRIPTION OF THE PREFERRED EMBODIMENT

Figure 1:
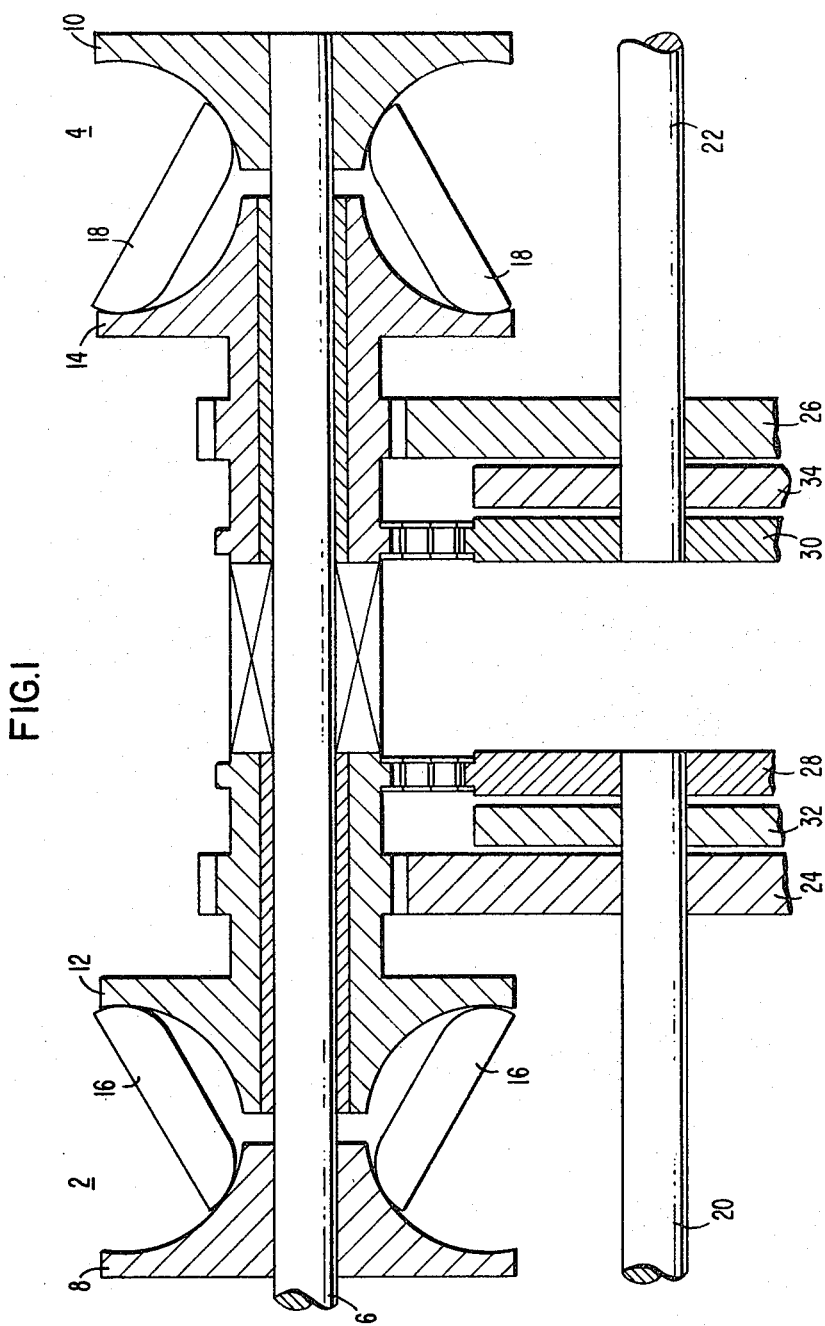
FIG. 1 shows schematically a transmission arrangement with two infinitely variable traction roller transmissions, one for each of a pair of drive wheels.

In the arrangement as shown in FIG. 1, two traction roller transmissions 2 and 4 are associated with a common input shaft 6. Each of the traction roller transmissions is of the type disclosed in U.S. Pat. No. 4,086,820 to which reference is made for detailed description of the transmissions. The toroidal input traction discs 8 and 10 are mounted on the common shaft 6 and the toroidal output discs 12 and 14 are rotatably supported on the shaft 6, each facing the respective opposite toroidal input discs 8 and 10 with the motion transmitting traction rollers 16 and 18 arranged between, and in frictional engagement with, the toroidal discs 8 and 12 and, respectively, 10 and 14. Each of the toroidal output discs 12 and 14 is drivingly connected to a wheel drive shaft 20, 22 by means of a gear drive 24, 26 for driving the associated wheels in one direction or, selectively, by a chain drive 28, 30 for driving the wheels in the opposite direction. Selection for forward or reverse is made by selective engagement of the gears 24, 26 or the chain sprocket wheels 28, 30 with the respective wheel drive shafts 20, 22 by means of clutches 32, 34.

When driving in a straight line the motion transmitting traction rollers will normally be positioned at the same angle so that the transmission ratio of both traction roller transmissions is the same.

When negotiating a curve, however, a vehicle's curve-inner wheels rotate at reduced speed while the curve-outer wheels rotate at increased speed. With the arrangement as shown in FIG. 1, this will cause an increase of torque applied to the inner wheels and a decrease of the torque applied to the curve-outer wheel. The hydraulic transmission ratio control arrangement of U.S. Pat. No. 4,086,820 will then immediately change the transmission ratios of the traction roller transmissions to decrease the speed of the curve-inner wheel and to increase the speed of the curve-outer wheel to provide a certain torque dependent on the control fluid pressure. The opposite will occur when the vehicle returns to straight line movement.

Both changes occur relatively slowly so that the automatic ratio change can easily follow the relative wheel speed changes. Furthermore, the difference in speed between the curve-inner and the curve-outer wheels is relatively small.

The situation, however, is quite different when one of the wheels is spinning on ice for example. Since the torque needed to rotate the spinning wheel is reduced the respective toroidal traction roller transmission will initiate a ratio change which provides for even greater speed of the spinning wheel. Sudden gripping of the spinning wheel will then cause a severe jolt on the respective traction roller transmission and may cause wear of, or damage to, the traction surfaces.

Figure 2:
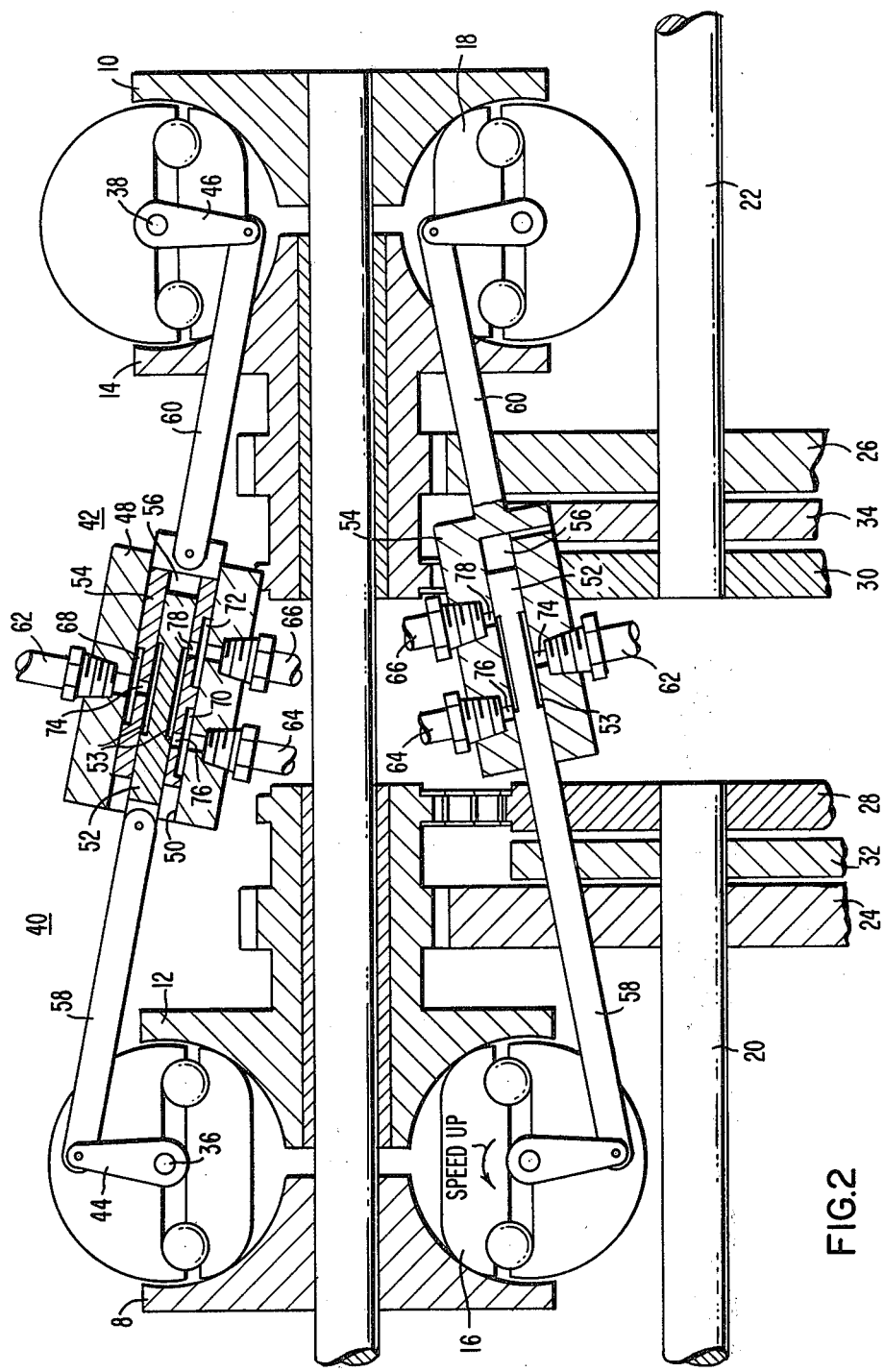
FIG. 2 shows a linkage with a control valve providing for interaction between the two transmissions limiting the difference in ratio adjustment for a traction roller transmission with a hydraulic ratio control arrangement.

FIG. 2 shows an arrangement in which differential speed of the curve-inner and outer wheels is limited and may be limited to the maximum value occurring during tightest cornering as permitted by the vehicle's steering arrangement.

As shown in FIG. 2, upper portion, the pivot support shafts (36, 38) for the traction rollers 16 and 18 are interconnected by a linkage arrangement 40 which includes a control valve structure 42 which controls the flow of pressurized fluid to the ratio change structure in such a manner that the differential speed is limited to a predetermined value.

The linkage 40 includes arms 44 and 46 connected to the pivot shafts 36 and 38 respectively. The valve structure 42 includes a housing 48 having a passage 50 slidably receiving therein control members 52 and 54. Control member 52 is movably received in an inner axial passage 56 within control member 54 and is connected by link 58 to the arm 44 of the pivot shaft 36. Control member 54 is linked by link 60 to the arm 46 of the pivot shaft 38. The valve housing 48 is provided with a pressurized fluid supply line 62 and two pressurized fluid discharge lines 64 and 66 through which the pressurized fluid needed to increase the transmission ratios for greater output speed is supplied to the ratio change structure of the two traction roller transmissions 2 and 4.

Adjacent the supply line 62 the control member 54 has a groove 68 and adjacent the discharge lines 64 and 66 the control member 54 has grooves 70 and 72. Openings 74, 76 and 78 will normally provide for communication of the pressurized fluid from the inlet 62 to the two outlets 64 and 66 through a recess 53 formed in control member 52, that is as long as openings 76 and 78 are not closed by the control member 52. This is normally the case since the arms 44 and 46 are so arranged that the links 58 and 60, and with them the control members 52 and 54, move in unison when the transmission ratio of the two traction roller transmissions is changed at the same rate so that pressurized fluid flow from the inlet 62 to both outlets 64 and 66 remains uninterrupted. If the transmission ratio of the two transmissions is different the position of the two control members relative to each other is changed. Within limits, however, as determined by the opening overlap of openings 76 and 78, such different relative position is permitted, the limit corresponding about to the speed differential of the wheels during tightest cornering. If the speed differential becomes greater as it might during wheel slipping, the pressurized fluid supply to the transmission serving the slipping wheel is shut off so as to prevent further change of the transmission ratio, that is further acceleration of the slipping wheel. If, for example, the wheel associated with the left side transmission is slipping and the pivot shaft 36 rotates in the indicated speed-up direction the control member 52 will be moved to the right into the control member 54 thereby closing the opening 76 and shutting off pressurized fluid flow to the supply line 64 for the speed change structure of the left side transmission.

With this arrangement transmission ratio adjustment is permitted independently for the two drive wheels within predetermined limits but not outside these predetermined limits. Jolts on the transmissions are therefore limited but also slipping of the wheels is limited providing for a truly limited slip power transmission structure which has no adverse effects during cornering when the relative speed difference of the two driven wheels is only relatively small.

The valve housing 48 preferably has a passage 50 of circular cross-section and both the control members 52 and 54 are preferably also circular, the outer member 54 being a cylinder and the inner member 52 being a spool disposed in the cylinder.

Both members are easy and inexpensive to manufacture.

A somewhat simplified control valve arrangement is shown in FIG. 2 for the lower half of the transmission. Here the ends of the links directly form the control members 52 and 54 and the pressurized fluid supply and discharge lines 62, 64 and 66 are directly connected to the outer control member 54. However, since the outer control member is movable with the link 60 the fluid supply and discharge lines are to be flexible. Functionally both arrangements are identical and the same reference numerals have therefore been used to indicate corresponding parts.

The present invention has been described in connection with infinitely variable traction roller transmissions but it may be used, of course, in connection with any transmission with infinitely variable transmission ratio. Infinitely variable belt-type transmissions would be quite suitable for use in connection with the present invention. The belt-type transmissions may be simply of the V belt friction-type or the higher power capacity shim-type belt transmissions in which the side walls of the pulleys have radial grooves receiving the ends of the shims of the belt for positive engagement between the belt and the pulley.

Further, it is not necessary that the control arrangement for limiting differential speed of the two transmissions be of the hydraulic type. Simply a mechanical linkage providing for limited relative movement of the two transmission ratio adjustment means would be sufficient. The two links could for example, so be joined that they are movable relative to each other only within predetermined limits. Also, springs could be provided to resiliently retain them within the center of such limits for smoother operation.

What is claimed is:

1. An infinitely variable traction roller transmission drive arrangement for driving different load members from a common power source, said arrangement comprising two traction roller transmissions with infinitely variable transmission ratios associated with a common input shaft, each having an output connected to one of said load members; each of said infinitely variable traction roller transmissions having oppositely disposed toric discs with motion transmitting traction rollers engaged between the opposite discs and supported by pivotal support shafts for transmitting motion between the discs with a variable transmission ratio depending on the angular position of said pivotal support shafts and including hydraulic transmission ratio control means for independently varying the transmission ratio of said transmissions and said arrangement further comprising a linkage interconnecting the corresponding pivotal support shafts of said two infinitely variable traction roller transmissions and having associated therewith a hydraulic valve structure controlling the pressurized fluid supply to said hydraulic transmission ratio control means so as to limit the difference in adjustment of their transmission ratios to a predetermined value.

2. An arrangement as recited in claim 1, wherein said linkage includes arms so mounted on said pivotal support shafts of said transmissions that their free ends move normally in the same direction when the transmission ratio of the transmissions is changed in the same sense and links are connected to said arms and said valve structure, said valve structure consisting of a cylinder associated with one of said links and having a pressurized fluid supply line and two pressurized fluid discharge lines, one of said discharge lines being connected to one and the other to the other of said transmissions, and a spool member associated with the other of said links and being movably disposed in said cylinder, said cylinder and spool member having fluid flow control passages permitting only limited relative differential positions of said links, said spool member blocking fluid flow to one discharge line when said differential limit is exceeded in one direction and blocking fluid flow to the other discharge line when said differential limit is exceeded in the other direction.

3. An arrangement as recited in claim 2, wherein said cylinder is movably disposed in a housing and said pressurized fluid supply and discharge lines are connected to said housing, said housing having fluid passages providing communication between the fluid supply and discharge lines and the respective control passages of said cylinder.

4. An arrangement as recited in claim 1, wherein said load members are two drive wheels of a vehicle and the limit in the transmission ratio difference is a value corresponding to the difference in speed of the two drive wheels in the smallest turning circle for which the vehicle is designed.

* * * * *